US010043205B2

(12) United States Patent
Gupta et al.

(10) Patent No.: US 10,043,205 B2
(45) Date of Patent: Aug. 7, 2018

(54) LEAD RECOMMENDATIONS

(71) Applicant: Microsoft Technology Licensing, LLC, Redmond, WA (US)

(72) Inventors: Abhishek Gupta, San Francisco, CA (US); Zang Li, Milpitas, CA (US); Anmol Bhasin, Los Altos, CA (US); Sachin Rekhi, Mountain View, CA (US); Annabel Fang Liu, Los Altos, CA (US); Angela Yoonjeong Yang, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 14/572,236

(22) Filed: Dec. 16, 2014

(65) Prior Publication Data

US 2015/0379602 A1 Dec. 31, 2015

Related U.S. Application Data

(60) Provisional application No. 62/019,254, filed on Jun. 30, 2014.

(51) Int. Cl.
*G06Q 30/00* (2012.01)
*G06Q 30/06* (2012.01)
*G09C 1/00* (2006.01)

(52) U.S. Cl.
CPC ........... *G06Q 30/0617* (2013.01); *G09C 1/00* (2013.01)

(58) Field of Classification Search
CPC .......................................... G06Q 30/06–30/08
USPC .............................................. 705/26.1–27.2
See application file for complete search history.

(56) References Cited

U.S. PATENT DOCUMENTS

| | | |
|---|---|---|
| 2008/0109445 A1 | 5/2008 | Williams et al. |
| 2009/0048859 A1 | 2/2009 | McCarthy et al. |
| 2011/0231230 A1 | 9/2011 | Christon et al. |
| 2012/0072264 A1* | 3/2012 | Perna ................. G06Q 30/0203 705/7.32 |
| 2012/0233035 A1 | 9/2012 | Wilgus et al. |

FOREIGN PATENT DOCUMENTS

| | | |
|---|---|---|
| CN | 105279672 A | 1/2016 |
| WO | WO-2016003507 A1 | 1/2016 |

OTHER PUBLICATIONS

"True Advantage Inc.'s Technology-Enabled Lead Generation for Financial Services Now Available on Salesforce.com's AppExchange" (PR Newswire Oct. 9, 2006) https://dialog.proquest.com/professional/docview/670857299?accountid=142257.*

(Continued)

*Primary Examiner* — Ethan D Civan
(74) *Attorney, Agent, or Firm* — Schwegman Lundberg & Woessner, P.A.

(57) ABSTRACT

A method and system for providing lead recommendations are disclosed. A server system stores profile information for a plurality of members of a server system. The server system then analyzes the stored profile information to identify one or more potential sales lead recommendations for a first member of the server system. The server system then ranks the one or more identified potential sales lead recommendations. The server system selects one or more of the identified sales lead recommendations and transmits the selected one or more identified sales lead recommendations to a client device associated with the first member of the server system.

19 Claims, 10 Drawing Sheets

(56) References Cited

OTHER PUBLICATIONS

"Oracle Previews Oracle(R) Sales Prospector". (PR Newswire, Jun. 10, 2008) https://dialog.proquest.com/professional/docview/676778098?accountid=142257 (Year: 2008).*

"International Application Serial No. PCT/US2015/023054, International Search Report dated Jul. 9, 2015", 2 pgs.

"International Application Serial No. PCT/US2015/023054, Written Opinion dated Jul. 9, 2015", 4 pgs.

"International Application Serial No. PCT/US2015/023054, International Preliminary Report on Patentability dated Jan. 12, 2017", 6 pgs.

* cited by examiner

FIGURE 5

WELCOME, John Smith

Overview | Profile | Customer Data | Lead Recommendations | Account Recommendation

SALES LEAD RECOMMENDATIONS

- Chris McGown — Chief Technology Officer, Pear, Inc. (502-1)
- John Kelepouris — Chief Optimization Coordinator, SoloMid, Inc. (502-2)
- Alice Yanyuk — Dynamic Web Co-ordicator, Baconsnap.com, Inc. (502-3)
- Arthur Dendi — Senior Creative Architect, selfiesy, Inc. (502-4)
- Rachel Walker — Internal Web Engineer, SoundSafe, Inc. (502-5)
- Gretchen Armstrong — Internal Infrastructure Manager, TokenRicotto, Inc. (502-6)

See More Recommendations

PEOPLE YOU MAY KNOW (508)
- Sarah Dargatz — CEO, Gadgets, Inc.
- Derrick Tedrick — Regional Manager, Widgets, Inc.
- Seth Whitmer — Software Engineer, SBM

MEMBER PROFILE VIEWS (410)
- 15 — Your profile has been viewed by 15 people in the last 7 days
- 37 — You have appeared in search results 37 times in the last 3 days

Your Network (412)
- 289 — Your 289 connections link you to 5,000,000+ members.

http://www.thesecondsocialnetwork.com/

LEAD RECOMMENDATIONS

RELATED APPLICATIONS

This application claims the benefit of priority to U.S. Provisional Patent Application Ser. No. 62/019,254, filed Jun. 30, 2014, which is incorporated herein by reference in its entirety.

TECHNICAL FIELD

The disclosed implementations relate generally to the field of social networks, and in particular to a system for recommending potential targets of sales professionals.

BACKGROUND

The rise of the computer age has resulted in increased access to personalized services online. As the cost of electronics and networking services drop, many services that were previously provided in person are now provided remotely over the Internet. For example, entertainment has increasingly shifted to the online space with companies such as Netflix and Amazon streaming TV shows and movies to members at home. Similarly, electronic mail (e-mail) has reduced the need for letters to be physically delivered. Instead, messages are sent over networked systems almost instantly. Online social networking sites allow members to build and maintain personal and business relationships in a much more comprehensive and manageable manner.

One important application of new computer technologies is the sales world. Sales professionals (e.g., people or companies that derive their income from selling goods or products to other individuals or companies) rely on sales leads (e.g., names and contact information of individuals or companies that will potentially want to purchase the product or service offered by the sales professionals) to make contacts that lead to sales. Networked computer systems can collect and process large amounts of data to streamline and enhance the system for generating sales leads. Thus, networked computer systems that store large amounts of data about companies and their employees can offer enhanced search capabilities to their members such that a member can specify search criteria and then receive search results that list one or more search results that match the specified criteria (e.g., recommendations for people who match the search query).

BRIEF DESCRIPTION OF THE DRAWINGS

Some implementations are illustrated by way of example and not limitation in the figures of the accompanying drawings, in which:

FIG. 5 is a member interface diagram illustrating an example of a member interface according to some implementations.

Like reference numerals refer to corresponding parts throughout the drawings.

DETAILED DESCRIPTION

The present disclosure describes methods, systems and computer program products for using existing member profile and activity data to determine sales leads to recommend to members of a network. In the following description, for purposes of explanation, numerous specific details are set forth to provide a thorough understanding of the various aspects of different implementations. It will be evident, however, to one skilled in the art, that any particular implementation may be practiced without all of the specific details and/or with variations, permutations and combinations of the various features and elements described herein.

The server system (e.g., system 120 in FIG. 1) generates sales leads without receiving specific search criteria (or a search query). For example, a large networked system receives a request for a webpage associated with a particular organization (e.g., the account page for a corporation) without a specific search query, and the large networked system generates and returns one or more sales lead recommendations for members associated with the particular organization based on the information that is stored about the organization, its employees, and the requesting member.

Recommendations can be generated by analyzing the member profiles and activity of at least some of the members of the system. The server system analyzes each member profile to identify one or more signals (e.g., data related to the member) that indicate the associated member is likely to have product purchase potential. Examples of information that is important in determining whether a particular member is likely to have product purchasing potential include, but are not limited to, a member's employer, title, job function, skills, work history, member interactions, and member profile. In some example embodiments the system identifies one or more potential sales leads based on an analysis of the data stored in the member profiles and ranks them based on suitability.

The system then selects a number of sales leads to transmit to a client device to display to a member. The number of sales leads is determined based on the amount of display area that is allocated to display sales lead recommendations. For example, when a member requests a page of a particular company, the system allocates a small section of the displayed interface to contain sales lead recommendations. The system then selects the number of sales leads that will fit into the allocated space (e.g., one or two recommendations).

Figure 1:
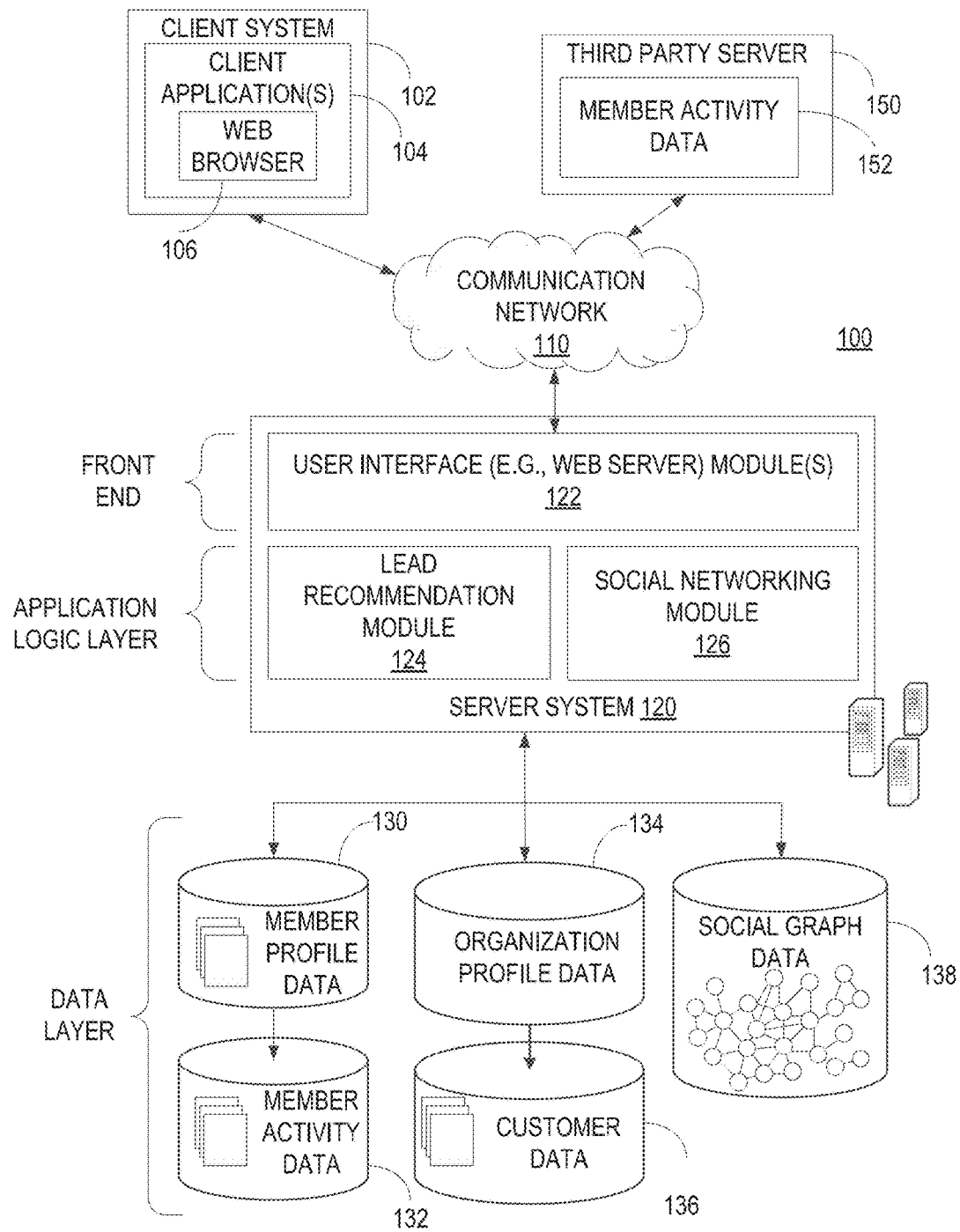
FIG. 1 is a network diagram depicting a client-server system that includes various functional components of a social network server system in accordance with some implementations.

FIG. 1 is a network diagram depicting a client-server system 100 that includes various functional components of a server system 120 in accordance with some implementations. The client-server system 100 includes one or more client systems 102, a server system 120, and one or more other third party server 150. One or more communications networks 110 connect these components. The communications network 110 may be any of a variety of network types, including local area networks (LANs), wide area networks (WANs), wireless networks, wired networks, the Internet, personal area networks (PANs), or a combination of such networks.

In some implementations a client system 102 is an electronic device, such as a personal computer, a laptop, a smartphone, a tablet, a mobile phone or any other electronic device capable of communication with a communication network 110. The client system 102 includes one or more client applications 104, which are executed by the client system 102. In some implementations, the client application(s) 104 includes one or more applications from the set consisting of search applications, communication applications, productivity applications, game applications, word processing applications, or any other useful applications. The client application(s) 104 include a web browser 106. The client system 102 uses the web browser 106 to communicate with the server system 120 and displays information received from the server system 120. In some implementations, the client system 102 includes an application specifically customized for communication with the server system 120 (e.g., a LinkedIn iPhone application).

In some implementations, the client system 102 sends a request to the server system 120 for a webpage associated with the server system 120 (e.g., the client system 102 sends a request to the server system 120 for an updated activity feed webpage). For example, a member of the client system 102 logs onto the server system 120 and clicks to view updates to a personalized event list. In response, the client system 102 receives the updated event list (e.g., news items, recommendations, friend status updates) and displays them on the client system 102.

In some implementations, as shown in FIG. 1, the server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various implementations have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the various implementations are by no means limited to this architecture.

As shown in FIG. 1, the front end consists of a user interface module (e.g., a web server) 122, which receives requests from various client systems 102, and communicates appropriate responses to the requesting client systems 102. For example, the user interface module(s) 122 may receive requests in the form of Hypertext Transport Protocol (HTTP) requests, or other web-based, application programming interface (API) requests. The client system 102 may be executing conventional web browser applications, or applications that have been developed for a specific platform to include any of a wide variety of mobile devices and operating systems.

As shown in FIG. 1, the data layer includes several databases, including databases for storing data for various members of the server system 120, including member profile data 130, member activity data 132 (e.g., data describing member interactions with the server system 120 or with other members throughout the server system 120), organization profile data 134, customer data 136 (e.g., data that describes business relationships between members of the server system 120 such as seller and customer relationships), and a database of social graph data 138, which is a particular type of database that uses graph structures with nodes, edges, and properties to represent and store data. Of course, with various alternative implementations, any number of other entities might be included in the social graph (e.g., companies, organizations, schools and universities, religious groups, non-profit organizations, and any other group), and as such, various other databases may be used to store data corresponding with other entities.

Consistent with some implementations, when a person initially registers to become a member of the server system 120, the person will be prompted to provide some personal information, such as his or her name, age (e.g., birth date), gender, interests, contact information, home town, address, educational background (e.g., schools, majors, etc.), current job title, job description, industry, employment history, skills, professional organizations, job history, personal contacts, memberships with third party servers 150, and so on. This information is stored, for example, in the member profile data 130.

In some implementations, the member profile data 130 includes member activity data 132. In other implementations, the member activity data 132 is distinct from, but associated with, the member profile data 130. The member activity data 132 includes activity data for each member of the social network server system 120. Member activity data includes, but is not limited to, the dates and times the member logs onto or off of the server system 120, information viewed by the member on the server system 120 (e.g., pages associated with people, organizations, jobs listings, brands, companies, and so on), communications made with other members (posts or messages), viewed lead recommendations, saved lead recommendations, and posts made by the member.

The customer data 136 also stores data related to organizations on the server system 120 and their members. Thus, members of the server system 120 may be associated with employers, customers, and other organizations such as schools, professional groups and non-profit organizations (e.g., based on interests, family connections, schools, employers, etc.)

Once registered, a member may invite other members, or be invited by other members, to connect via the network service. A "connection" may include a bi-lateral agreement by the members, such that both members acknowledge the establishment of the connection. Similarly, with some implementations, a member may elect to "follow" another member. In contrast to establishing a "connection", the concept of "following" another member typically is a unilateral operation and, at least with some implementations, does not include acknowledgement or approval by the member that is being followed. When one member follows another, the member who is following may receive automatic notifications about various activities undertaken by the member being followed. In addition to following another member, a member may elect to follow a company, a topic, a conversation, or some other entity, which may or may not be included in the social graph. Various other types of relationships may exist between different entities and are represented in the social graph data 138.

The organization profile data 134 also includes organizational activity data. Organizational activity includes information that details changes within a plurality of organizations, including but not limited to, changes in the staff of the organization, changes in an organization's location, changes in an organization's business, and any other information related to an organization.

In some example embodiments the customer data 136 includes sales relationships for one or more members and sales histories (e.g., products sold, dates of the sales, cost of the products, and so on). For example, customer data 136 includes a list of customers, target companies, previous sales, sales preferences, job description, and any other data relevant to sales professionals.

The server system 120 may provide a broad range of other applications and services that allow members the opportunity to share and receive information, often customized to the interests of the member. For example, with the server system 120 includes a social networking service. In some implementations, the social networking service may include a photo sharing application that allows members to upload and share photos with other members. As such, at least with some implementations, a photograph may be a property or entity included within a social graph. With some implementations, members of a social network service may be able to self-organize into groups, or interest groups, organized around a subject matter or topic of interest. In some implementations, the data for a group may be stored in a database. When a member joins a group, his or her membership in the group will be reflected in the organization activity data in organization profile data 134, the member activity data 132, and the social graph data 138.

With some implementations, members can be affiliated with a particular organization in an employee/employer relationship. The server system 120 will store this information in the member profile data 130, the organization profile data 134, and potentially, in the member activity data 132. For example, member A lists Company C as an employer. This is stored in the member profile associated with member A and in the organization profile of Company C. If members of the social network service indicate an affiliation with a company at which they are employed, news and events pertaining to the company are automatically communicated to the members. With some implementations, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data 138.

In some implementations, the application logic layer includes various application server modules, which, in conjunction with the user interface module(s) 122, generate various user interfaces (e.g., web pages) with data retrieved from various data sources in the data layer. With some implementations, individual application server modules are used to implement the functionality associated with various applications, services and features of the social network service. For instance, a messaging application, such as an email application, an instant messaging application, or some hybrid or variation of the two, may be implemented with one or more application server modules. Similarly, a search engine enabling members to search for and browse member profiles may be implemented with one or more application server modules. Of course, other applications or services that utilize the lead recommendation module 124 or the social networking module 126 may be separately implemented in their own application server modules.

In addition to the various application server modules, the application logic layer includes a lead recommendation module 124 and a social networking module 126. As illustrated in FIG. 1, with some implementations, the lead recommendation module 124 is implemented as a service that operates in conjunction with various application server modules. For instance, any number of individual application server modules can invoke the functionality of the lead recommendation module 124 to provide lead recommendation services. However, with various alternative implementations, the lead recommendation module 124 may be implemented as its own application server module such that it operates as a stand-alone application. With some implementations, the lead recommendation module 124 includes or has an associated publicly available application programming interface (API) that enables third-party applications to invoke the functionality of the lead recommendation module 124.

Generally, the lead recommendation module 124 assists members of the server system 120 that are sales professionals to identify new potential customer targets (e.g., leads) based on the information stored at the server system 120 or received from the third party server 150 (e.g., a customer relationship system (CRM)). In some example embodiments the server system 120 imports data from a third party server 150 including, but not limited to, existing customers, accounts, messages, social networking data, profile views, preferences, contact data, and saved contacts.

In some example embodiments the sales professionals have submitted one or more target organizations to the server system 120.

The server system 120 then analyzes the data stored at the server system 120 to identify one or more potential target members (e.g., targeted as potential buyers of a seller member's product) based on the stored member data. The server system 120 uses information associated with other members to identify potential target members. Some factors that the server system 120 uses to identify potential target members include the member's location, the organization that the member is associated with (e.g., the member's employer), the member's title (or job function), the member's contact list, and so on.

The server system 120 also identifies potential target members for a first member based on the activities that the first member has already performed on the server system 120. For example, the server system 120 detects when a member has an interaction with another member of the server system 120, such as: sending them an email, saving their contact information, viewing their profile, or importing their data from a third party server system. The server system 120 then analyzes the saved interactions to determine current customers or leads of interest to the first member (e.g., leads that the first member has expressed interest in by viewing a profile or sending a message). For example, if the first member has viewed member Y's profile and then saved that profile as an interesting or important lead, the server system 120 is able to determine that the first member has interest in member Y. The server system 120 can then search through the profiles of other members to identify members who are similar to member Y.

The server system 120 then ranks the one or more identified potential target members. Each identified target member is given a match score based on one or more factors. In some example embodiments the member preferences of the first member are used to generate a match for each potential member. In other embodiments potential target members are ranked based on a calculation of nearness in the social graph to the first member. For example, the potential target members that have significant numbers of contacts in common, have similar biographical details (e.g., education, past work history, membership in organizations such as fraternities, home addresses, or interaction with similar non-profits), and any other commonality in the information stored in the social graph or the profiles of the members are ranked higher than potential target members that have no commonality with the first member. In some example embodiments the more commonality between two members, the higher the ranking, such that the potential target member with the most in common with the first member or the first member's current customers are ranked the highest.

In some example embodiments the match score is time weighted, such that activities or commonalities that occurred more recently are weighted more heavily. For example, the messages and profile views that are more recent are more important than old messages and/or profile views. In some example embodiments, popular members (e.g., members who have been highly rated, whose profiles are frequently view, or whose profile is frequently saved) are more highly rated than members without as many profile views or high ratings (e.g., who are less popular).

Once one or more potential target members have been ranked, the server system 120 selects one or more of the potential target members to recommend to the first member as a sales lead recommendation. In some example embodiments the number of sales lead recommendations selected by the server system 120 is based on the amount of space available to display sales lead recommendations. For example, the first member requests a web page that is not associated with sales lead recommendations. The server system 120 determines that a portion of the web page is available for displaying sales lead recommendations (e.g., an open section beside or below the requested content) and selects one or two recommendations with the highest match score. In another example, the first member requests a web page of sales lead recommendations. In this case the web page has a much larger area dedicated in which to display lead recommendations and thus selects a larger number of sales lead recommendations to display.

The selected one or more sales lead recommendations are transmitted to the client system 102 for display to the requesting first member.

The third party server 150 is a computer system operated by an entity distinct from the party that operates the server system 120. The third party server 150 includes member activity data 152. The member activity data 152 may include social networking data, profile views, messaging data, customer data, lead data, account data, and organization data.

Figure 2:
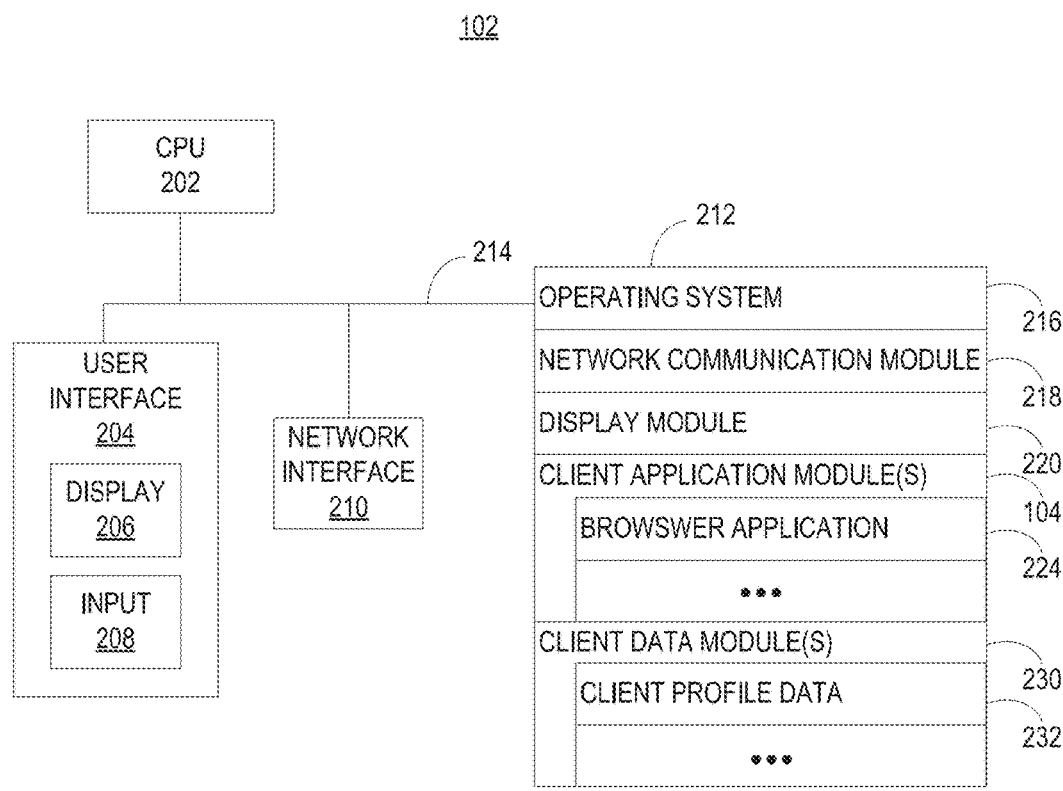
FIG. 2 is a block diagram illustrating a client system in accordance with some implementations.

FIG. 2 is a block diagram illustrating a client system 102 in accordance with some implementations. The client system 102 typically includes one or more processing units (CPUs) 202, one or more network interfaces 210, memory 212, and one or more communication buses 214 for connecting these components. The client system 102 includes a user interface 204. The user interface 204 includes a display device 206 and optionally includes an input means such as a keyboard, mouse, a touch sensitive display, or other input buttons 208. Furthermore, some client systems 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer readable storage medium.

In some implementations, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks (e.g., network 110), such as the Internet, other wide area networks, local area networks, metropolitan area networks, etc.;
- a display module 220 for enabling the information generated by the operating system 216 and client applications 104 to be presented visually on the display 206;
- one or more client applications 104 for handling various aspects of interacting with the server system (FIG. 1, 120), including but not limited to:
  - a browser application 224 for requesting information from the server system (e.g., system 120 in FIG. 1) (e.g., product pages and member information) and receiving responses from the server system (e.g., system 120 in FIG. 1); and
- a client data module 230, for storing data relevant to the client system 102, including but not limited to:
  - client profile data 232 for storing profile data related to a member of the server system (e.g., system 120 in FIG. 1) associated with the client system 102.

Figure 3:
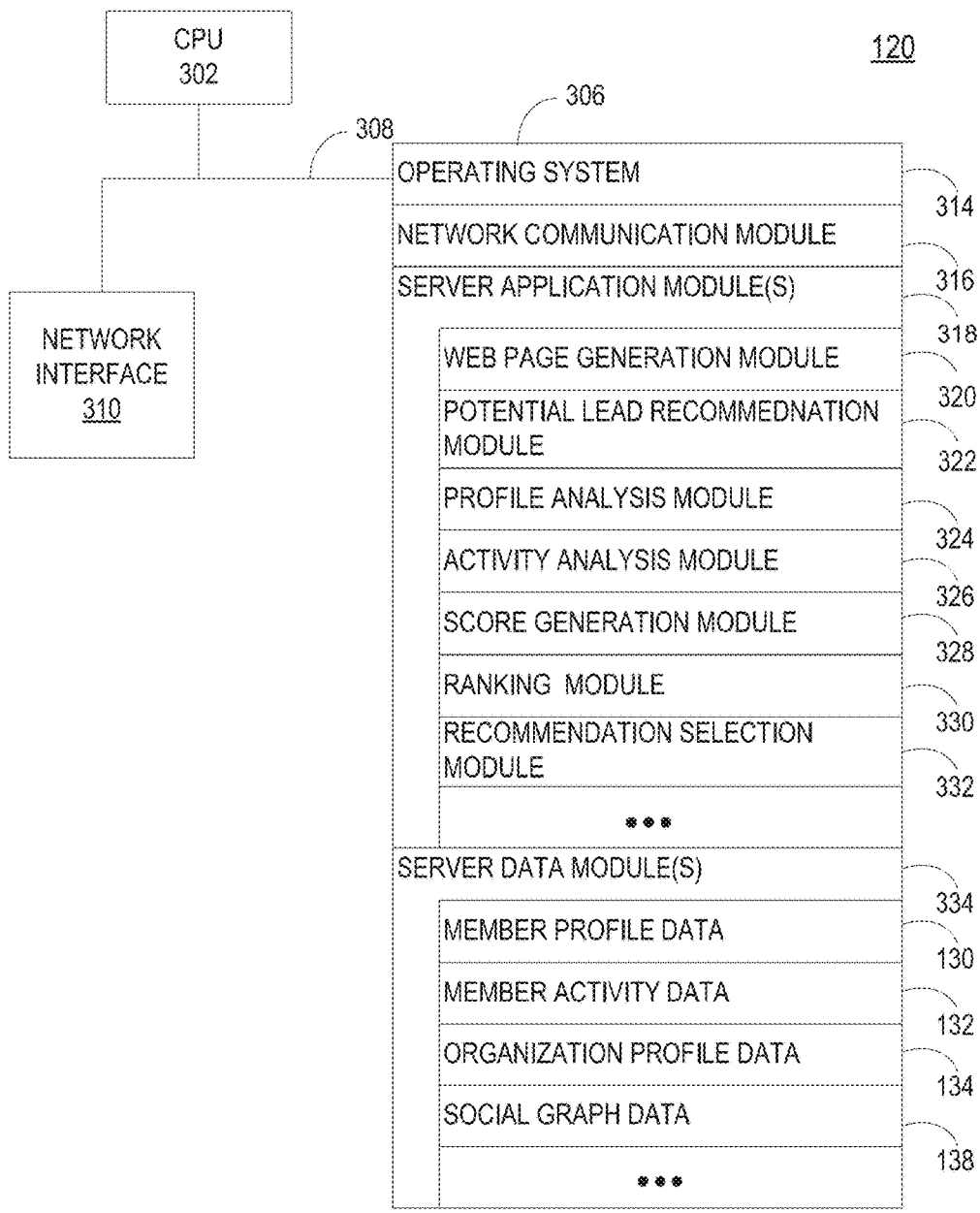
FIG. 3 is a block diagram illustrating a server system in accordance with some implementations.

FIG. 3 is a block diagram illustrating the server system 120 in accordance with some implementations. The server system 120 typically includes one or more processing units (CPUs) 302, one or more network interfaces 310, memory 306, and one or more communication buses 308 for connecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some implementations, memory 306 or the computer readable storage medium of memory 306 stores the following programs, modules and data structures, or a subset thereof:

- an operating system 314 that includes procedures for handling various basic system services and for performing hardware dependent tasks;
- a network communication module 316 that is used for connecting the social networking server system 120 to other computers via the one or more communication network interfaces 310 (wired or wireless) and one or more communication networks (e.g., network 110), such as the Internet, other wide area networks, local area networks, metropolitan area networks, and so on;
- one or more server application modules 318 for performing the services offered by server system 120, including but not limited to:
  - a web page generation module 320 for receiving requests from members of the server system 120 and in response, generating web pages that are responsive to those requests, including but not limited to requests to view the member profile, requests to see an activity wall, requests to see social graph data, requests for lead recommendations, and so on;
  - a potential lead recommendation module 322 for analyzing a group of members of the server system 120 to determine whether any of the members are potential target members to send as sales lead recommendation to a member of the server system 120;
  - a profile analysis module 324 for analyzing a member's profile to determine whether the member is a good match for a requesting member based on the information stored in the member profile including, but not limited to, the member's employer, location, seniority, job title, work history, interests, skills, social graph, and so on;
  - an activity analysis module 326 for tracking the activities of multiple members of the server system 120 (e.g., any member that agrees to activity tracking) and then using those tracked activities to improve sales lead recommendations for the tracked member;
  - a score generation module 328 for generating a matching score between one or more potential target members and a first member (e.g., the member for whom the server system 120 is generating sales leads);
  - a ranking module 330 for ordering the identified potential target members based on the generated match score; and
  - a recommendation selection module 332 for selecting one or more of the potential target members' sales lead recommendations;
- server data module(s) 334, holding data related to social network server system (FIG. 1, 120), including but not limited to:
  - member profile data 130 including both data provided by the member person who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, seller preferences, inferred member information based on member activity, social graph data 138, and overall trend data for the server system 120, and so on;
  - member activity data 132 including data representing any interaction the member has with the server system 120, including but not limited to log on/log off events, messages, invites, page views, saved profiles, viewing time, and so on;
  - organization profile data 134 including data describing one of more organizations (e.g., companies, corporations, non-governmental organizations, government entities and so on) and
  - social graph data 138 including data that represents members of the server system 120 and the social connections between them.

Figure 4:
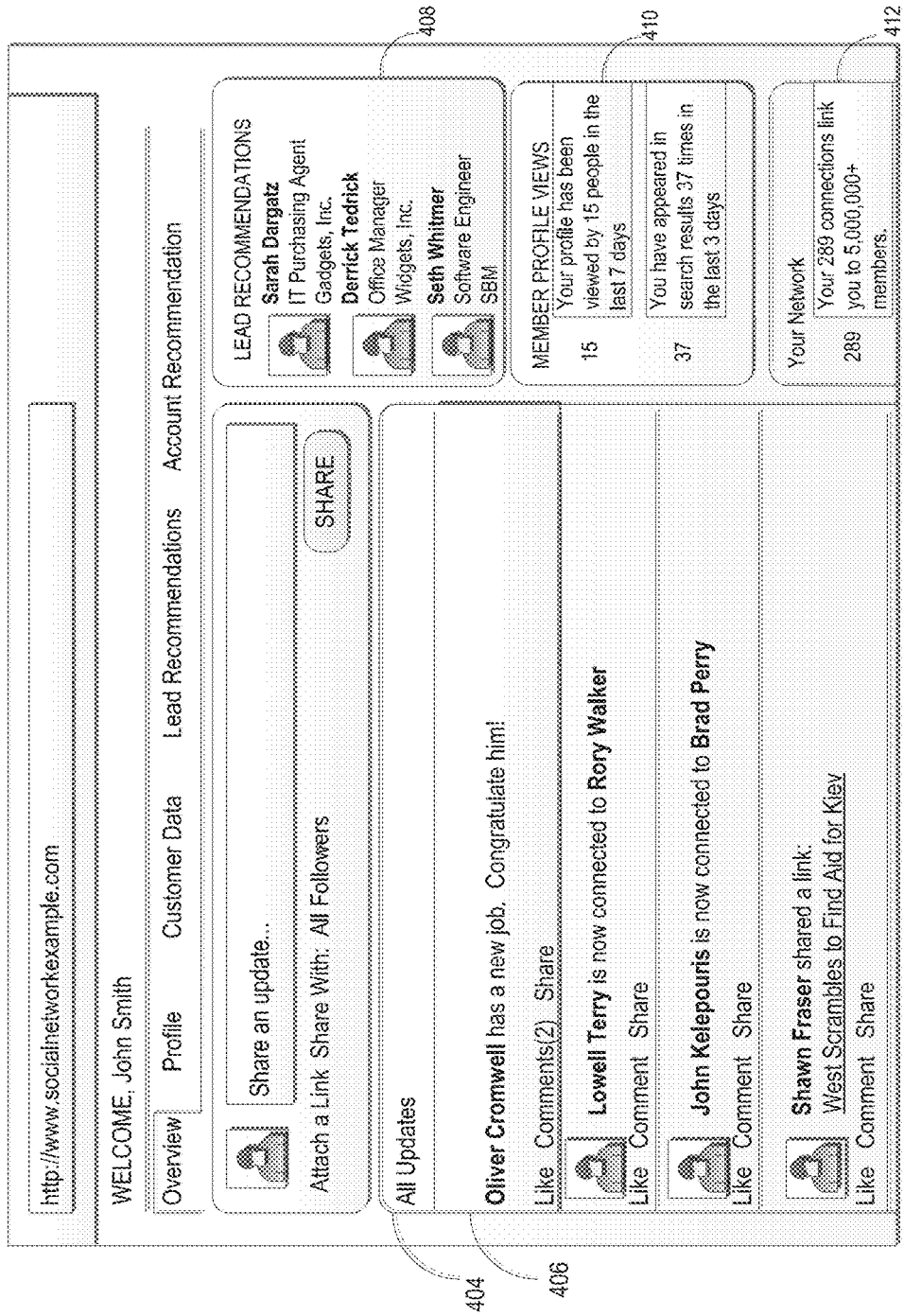
FIG. 4 is a member interface diagram illustrating an example of a member interface or web page having a personalized data feed (or content stream) via which a member of a social network service receives messages, status updates, notifications, and recommendations, according to some implementations.

FIG. 4 is a member interface diagram illustrating an example of a user interface 400 or web page that incorporates a lead recommendation service into a social networking service. The user interface 400 has a personalized data feed (or content stream) via which a member of a social network service receives messages, status updates, notifications, and recommendations, according to some implementations. In the example user interface 400 of FIG. 4, the content module depicted represents a personalized data feed or content stream 404 for a member of the social networking service with the name John Smith. In this example, not only does the content stream 404 present content selected specifically for John Smith, the content stream 404 itself is presented within a member interface or web page that is personalized for John Smith. With some implementations, a personalized data feed or content stream 404 has associated with it various configuration settings that enable the member to specifically filter or select the type of content the member desires to view in the personalized content stream 404. In this example, the message or status update with reference number 406 is a post noting that Oliver Cromwell has a new job.

As shown in FIG. 4, the user interface 400 has, in addition to the content stream 404, the user interface 400 includes additional information in specific sections with reference numbers 408, 410, and 412. The user interface 400 includes a section 408 of lead recommendations. Each lead recommendation includes the name of the lead contact (e.g., Sarah Dargatz) as well as some information about them (e.g., IT purchasing agent for Gadgets, Inc.). Members can click on the various lead recommendations to obtain additional contact information for each lead recommendation. Thus, the server system 120 can provide lead recommendations to members who have signed up for the lead recommendation service without the member specifically requesting lead recommendations. Additional sections of the user interface 400 include a section 410 that details the member profile viewing statistics and a section 412 that contains information about the member's social network.

FIG. 5 is a member interface diagram illustrating an example of a member interface 400 or web page, similar to that shown in FIG. 4. As can be seen, a lead recommendations tab 506 has been selected and the activity feed has been removed. In its place a sales lead page 504 has been displayed. The sales lead page 504 includes a plurality of sales lead recommendations 502-1 to 502-6, wherein each sales lead recommendation 502 displays a member name and includes basic information about the member, such as their names, titles, employer, and basic contact information. Members can then select particular leads to get additional information and the ability to contact the sales lead.

The user interface 400 also includes information in side sections of the interface 400 including a contact recommendation section 508, profile viewership statistic section 410, and a social graph statistic section 412.

Figure 6:
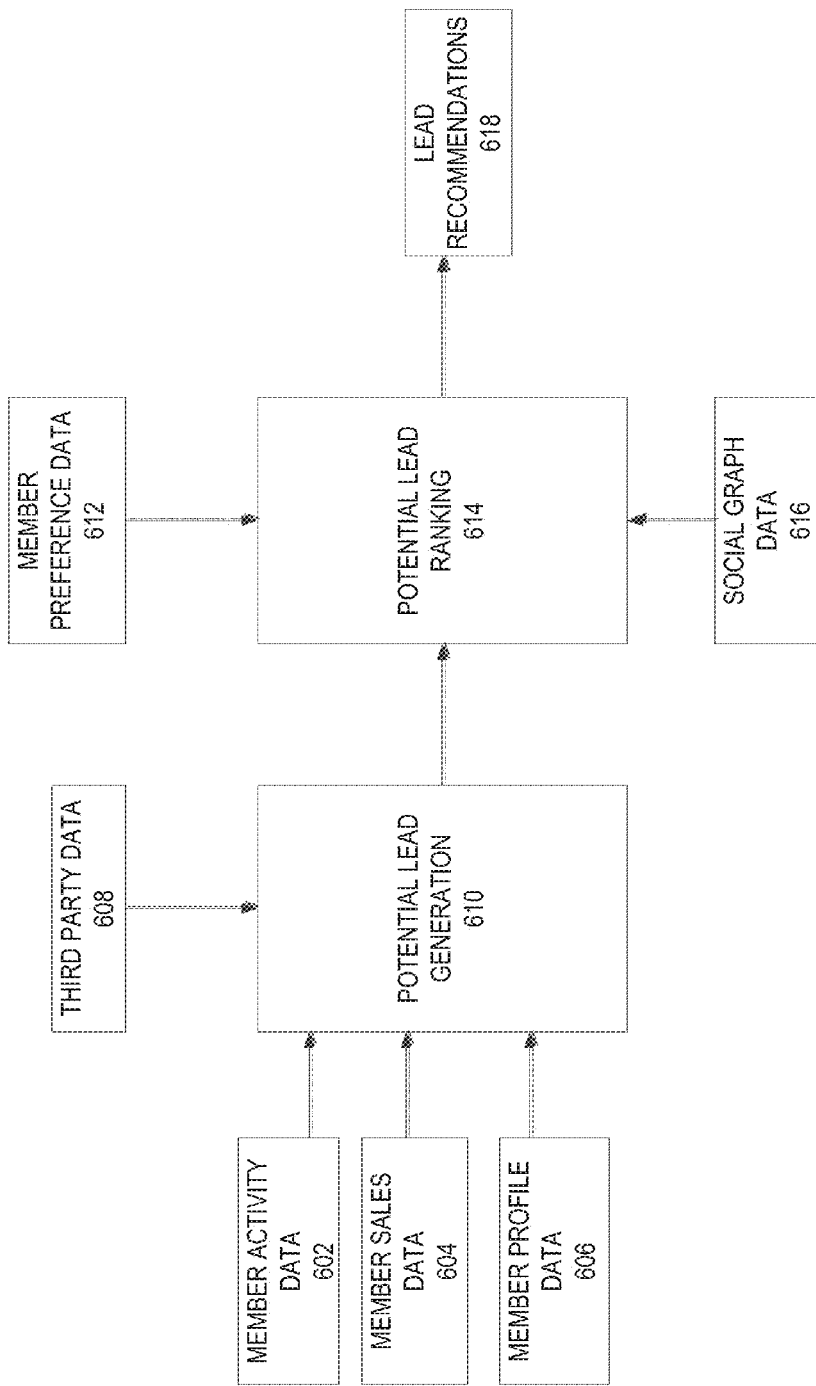
FIG. 6 is a flow diagram illustrating a method for generating sales lead recommendations, according to some implementations.

FIG. 6 is a flow diagram illustrating a method for generating sales lead recommendations, according to some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 120).

In some implementations, the method is performed at a server system (e.g., system 120 in FIG. 1) including one or more processors and memory storing one or more programs for execution by the one or more processors. In some implementations the server system (e.g., system 120 in FIG. 1) is associated with a social networking service.

In an example embodiment, the server system (e.g., system 120 in FIG. 1) generates (610) one or more potential sales lead recommendations. To generate potential lead recommendations the server system (e.g., system 120 in FIG. 1) accesses data stored in the server system including member profile data 606 (e.g., data about the characteristics of a plurality of members of the server system), member sales data 604 (e.g., data that describes the buyer-seller relationships between members of the server system 120), and member activity data 602 (e.g., data that describes activities that the members have conducted through the server system (e.g., system 120 in FIG. 1) including, but not limited to viewing profiles, saved recommendations, successful sales, messages, social contacts, and so on.)

The server system also accesses data 608 from a third party server system (e.g., an independent CRM). Using all the collected information, the server system (e.g., system 120 in FIG. 1) then analyzes one or more data signals to determine whether a respective member is likely to have purchasing potential for goods and services.

The server system (e.g., system 120 in FIG. 1) also analyzes member activities to identify members of the server system (e.g., system 120 in FIG. 1) that members have previously found interesting. For example, certain member actions increase the likelihood that a given member is a potentially good sales lead recommendation. A member whose profile is regularly viewed, saved, and messaged is more likely to be a good sales lead recommendation than a member whose profile is rarely visited or saved.

In addition, the server system (e.g., system 120 in FIG. 1) analyzes the previous actions and customer relationships of a respective member when generating sales leads for that respective member. The server system (e.g., system 120 in FIG. 1) identifies attributes of members that the respective member has previously sold to or whose profile the respective member has saved. The server system (e.g., system 120 in FIG. 1) can then identify members with similar attributes.

The server system (e.g., system 120 in FIG. 1) then collects all the identified potential sales leads recommendation into a list of sales lead recommendations. The server system (e.g., system 120 in FIG. 1) then ranks (614) each potential sales lead based on the degree to which the potential sales lead matches a particular member of the server system.

In some example embodiments the ranking 614 is based on member preference data 612. Member preference data 612 includes specific preferences received from a respective member, including a specific geographic location, a specific industry, a particular company or group of companies, a particular role, a particular level of seniority, or other information stored in a member profile. For example, a respective member of the server system (e.g., system 120 in FIG. 1) is assigned to sell in a particular geographic location (e.g., a city or a state) and notifies the server system (e.g., system 120 in FIG. 1) that sales lead recommendations need to be within the specified geographic location.

The server system (e.g., system 120 in FIG. 1) also uses social graph data 616 associated with the members of the server system (e.g., system 120 in FIG. 1) to rank the list of potential lead recommendations. For example, each member in the server system has a network proximity score for at least some of the other members of the server system (e.g., system 120 in FIG. 1). A network proximity score is a score that indicates a social distance between two members and takes into account information received from the members and inferred by the system. For example, the network proximity score can include the number of links needed to join the two members (e.g., if member A is connected to member B and member B is connected to member C, members A and C only need to be connected by one link, member B). Network proximity score can also take into account work history, education, geographic working or living location, organization membership, and any other relevant factor.

Once the list of potential lead recommendations has been ranked, the server system (e.g., system 120 in FIG. 1) selects one or more of the lead recommendations to be transmitted to the client system (e.g., system 102 in FIG. 1) associated with a respective member. The actual number of selected lead recommendations is determined based on the space available to display recommendations and the preferences of the member.

Figure 7A:
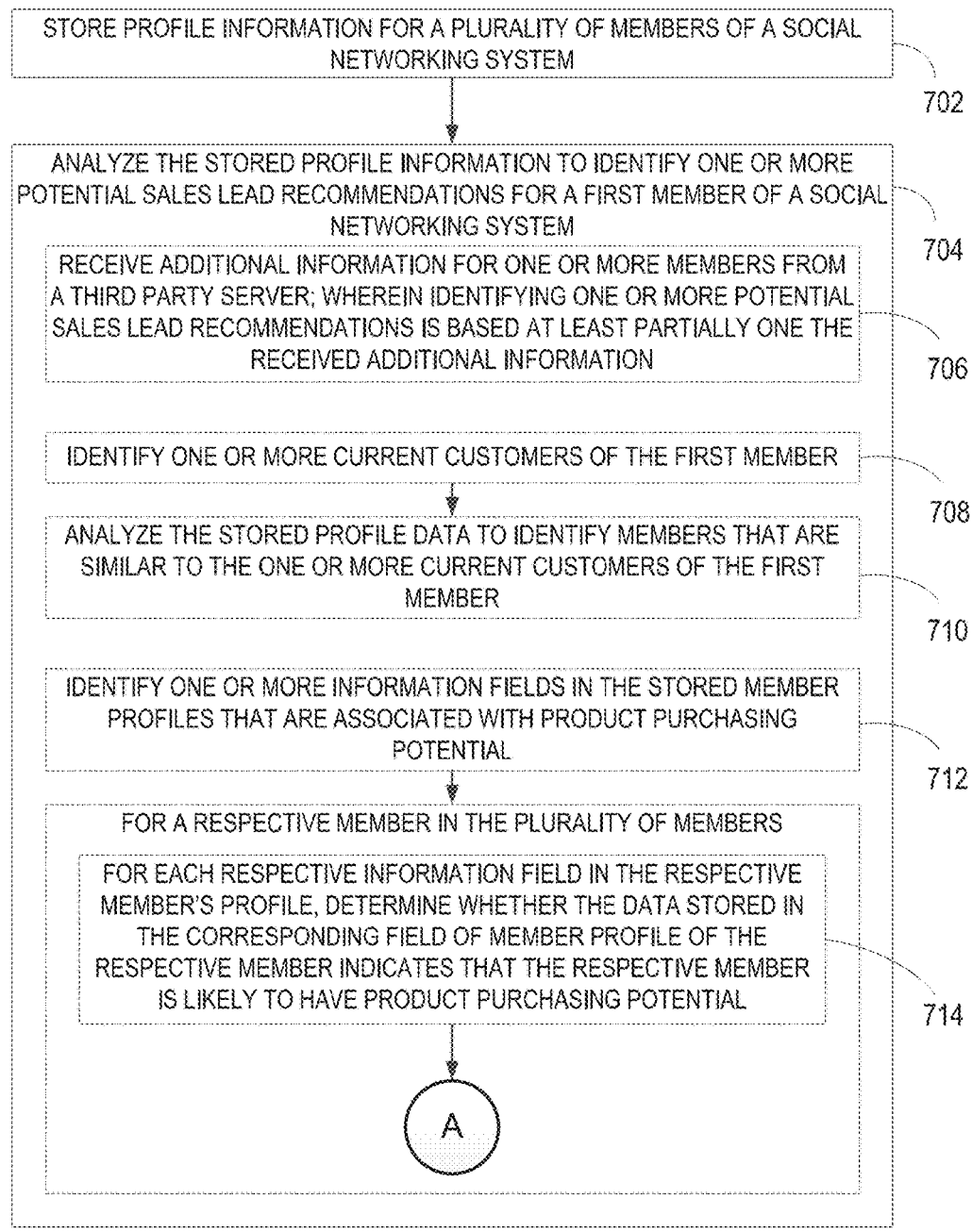
FIG. 7A is a flow diagram illustrating a process for generating lead recommendations in accordance with some implementations.

FIG. 7A is a flow diagram illustrating a process for generating lead recommendations in accordance with some implementations. Each of the operations shown in FIG. 7A may correspond to instructions stored in a computer memory or computer readable storage medium. Optional operations are indicated by dashed lines (e.g., boxes with dashed-line borders). In some implementations, the method described in FIG. 7A is performed by the server system (FIG. 1, 120).

In some implementations, the method is performed at a server system (e.g., system 120 in FIG. 1) including one or more processors and memory storing one or more programs for execution by the one or more processors. In some implementations the server system (e.g., system 120 in FIG. 1) is associated with or hosts a social networking service.

The server system (e.g., system 120 in FIG. 1) stores (702) stores profile information for a plurality of members of a server system. The stored profile information includes member activity data for the plurality of members of the server system. In some example embodiments the stored profile information includes customer data for the first member of the server system. Customer data is information describing customer relationships between the members. For example if member A is selling widgets to member Y, the customer data will list member Y as a customer of member A.

In some example embodiments information stored in the member profile is generalized. For example, two members might have different jobs titles but perform essentially the same role. As such, the server system (e.g., system 120 in FIG. 1) determines the generalized role for each member based on the other information stored it he member profile (e.g., education, work history, contacts, and so on.) The generalized role can then be used to find better sales lead recommendations. Similarly, a member's seniority ranking can be generalized and used in the ranking of members for potential recommendation.

The server system analyzes (704) the stored profile information to identify one or more potential sales lead recommendations for a first member of a server system. In some example embodiments the analysis is performed without a specific search request from the first member or a search query. Instead the server system (e.g., system 120 in FIG. 1) begins analysis in response to a general requests for lead recommendations from the first member or based on a determination that a requested web page is related to sales leads (e.g., the member is viewing a company profile webpage).

In some example embodiments, potential sales leads are identified based solely on the preferences of the member and an influencer score associated with the potential sales leads. This is especially true when the server system (e.g., server system 120 in FIG. 1) does not have previously established sales leads for a member and thus cannot yet perform a commonalities analysis for additional sales lead recommendations.

The server system (e.g., server system 120 in FIG. 1) determines that the member has a requested a web page for a specific organization. In response, the server system (e.g., server system 120 in FIG. 1) determines whether the member has any associated geographic preferences and role (e.g., the job title or role that a particular potential lead has) preferences. In accordance with a determination that the member has both geographic and role preferences, the server system (e.g., server system 120 in FIG. 1) identifies any potential leads (e.g., employees or owners) of the specific organization that match both the geographic preferences and the role preferences of the member. For example, member A prefers potential leads that are based either in Houston (where member A lives) or New York (the headquarters of his organization) and that work in human resources (HR). The server system (e.g., server system 120 in FIG. 1) then identifies any potential leads for the specific organization that meet both of these criteria.

Once the server system (e.g., server system 120 in FIG. 1) has identified all the potential leads within the organization that match both the geographic preferences and the role preferences of the member, the server system (e.g., server system 120 in FIG. 1) ranks according to a generated influencer score (e.g., any score that represents how likely a potential lead is to have decision making authority or influence within an organization). In this way the potential leads with high influencer scores are shown first.

In some example embodiments, the server system (e.g., server system 120 in FIG. 1) determines how many potential leads to initially display to the member based on the member's preference and the amount of space available on the web page. If the identified potential leads that match both the location and role preferences are fewer than the number needed to display to the member, the server system (e.g., server system 120 in FIG. 1) then identifies potential sales leads that match at least one of the location or role preferences of the member, ranks them by influencer score and then displays them lower than the potential sales leads that match both the location and the role preferences.

In some example embodiments, the server system (e.g., server system 120 in FIG. 1) still needs additional potential sales leads and thus identifies potential sales leads within the specific organization that match neither the location nor the role preferences of the member but have high influencer scores. Once a sufficient number of sales leads have been identified, the server system (e.g., server system 120 in FIG. 1) then transmits this list to the client system (e.g., system 102 in FIG. 1) for display.

In some example embodiments the server system (e.g., system 120 in FIG. 1) receives (706) additional information for one or more members from a third party server, wherein identifying one or more potential sales lead recommendations is based at least partially one the received additional information.

In some example embodiments, the server system identifies (708) one or more current customers of the first member. The server system then analyzes the stored profile data (710) to identify members that are similar to the one or more current customers of the first member. For example, the server system identifies members with similar job functions, titles, or levels of seniority.

In some example embodiments the sales leads are generated based on information stored about both the first member (e.g., the sales professional) and the sales target members (e.g., members of a server system). The stored information can be information explicitly submitted to the system by the members as when they registered or signed up for the system. In addition, the server system (e.g., system 120 in FIG. 1) can infer information about members based on the members' profiles, social graphs, and activities.

In some example embodiments the server system (e.g., system 120 in FIG. 1) imports member data from third party server systems (e.g., third party server 150 in FIG. 1). Importing data involves receiving permission from the involved members and accessing the third party server system via available tools (e.g., APIs) to download and store the member information on the server system (e.g., system 120 in FIG. 1).

In some example embodiments the first member transmits a list of one or more target organizations to the server system (e.g., system 120 in FIG. 1). Then the server system then analyzes the members who are associated with the one or more target organizations. In this way, the server system is able to generate sales leads from organizations that the member is specifically targeting. For example, if the first member (e.g., a sales professional) is specifically targeting Corporation A, Corporation B, and Corporation C, the server system then filters the potential target members to focus on those members who are employees or owners of Corporations A, B, and C.

In some example embodiments, analyzing the stored profile information to identify one or more potential sales lead recommendations further includes the server system identifying (708), based on activity data associated with the first member, one or more current members that are of interest to the first member. The server system analyzes (710) the stored profile data to identify members that are similar to the one or more current members that are of interest to the first member. The activity data includes profile views, profile saves, messages between members, and completed sales.

In some example embodiments analyzing the stored profile information to identify one or more potential sales lead recommendations further includes the server system (e.g., system 120 in FIG. 1) identifying (712) one or more information fields in the stored member profiles that are associated with product purchasing potential. For a respective member in the plurality of members, the server system (e.g., system 120 in FIG. 1) determines (714) whether the data stored in the corresponding field of member profile of the respective member indicates that the respective member is likely to have product purchasing potential for each respective information field in the respective member's profile.

Figure 7B:
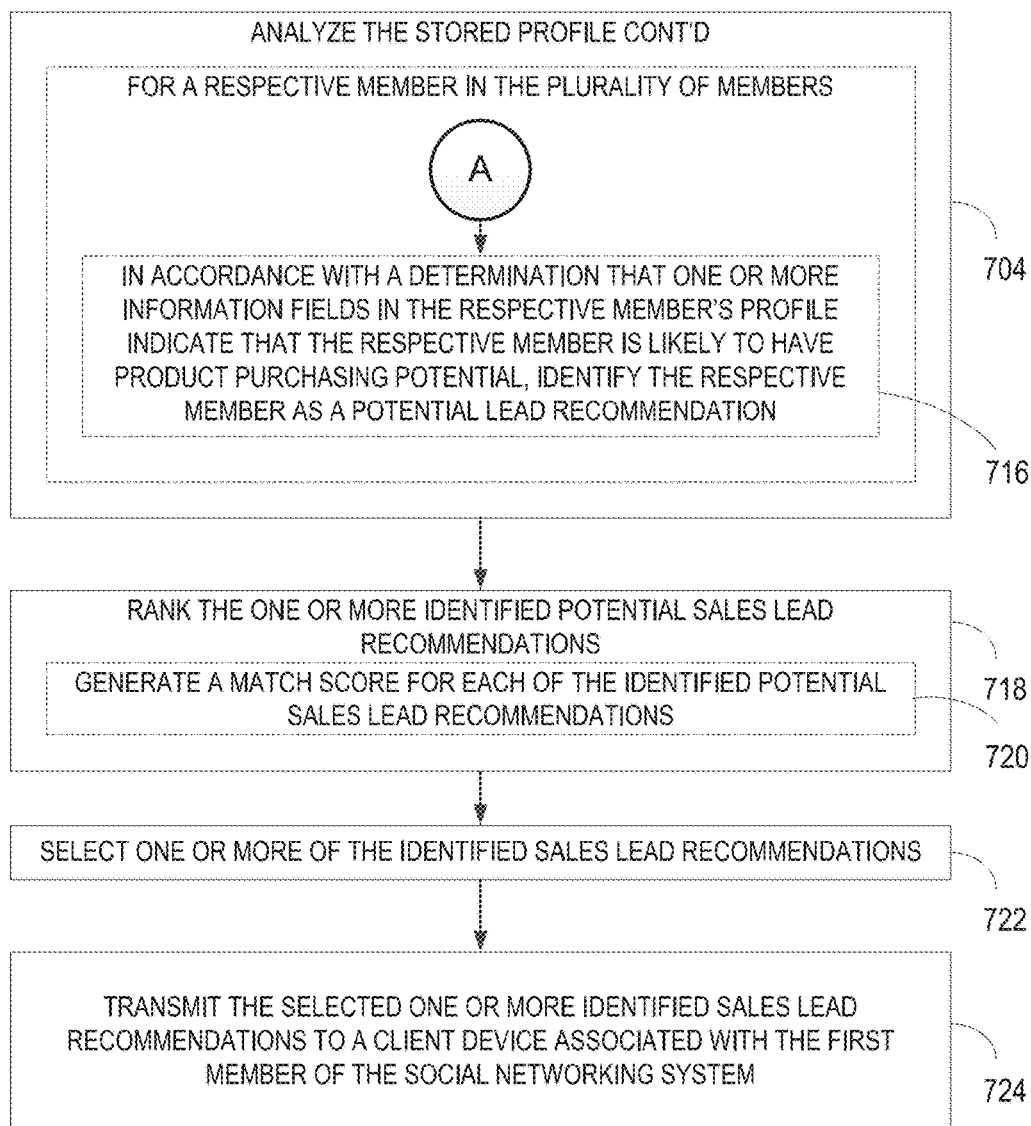
FIG. 7B is a flow diagram illustrating a process for generating lead recommendations in accordance with some implementations.

FIG. 7B is a flow diagram illustrating a process for generating lead recommendations in accordance with some implementations. Each of the operations shown in FIG. 7B may correspond to instructions stored in a computer memory or computer readable storage medium. Optional operations are indicated by dashed lines (e.g., boxes with dashed-line borders). In some implementations, the method described in FIG. 7B is performed by the server system (FIG. 1, 120).

In some implementations, the method is performed at a server system including one or more processors and memory storing one or more programs for execution by the one or more processors.

In accordance with a determination that one or more information fields in the respective member's profile indicate that the respective member is likely to have product purchasing potential, the server system (e.g., system 120 in FIG. 1) identifies (716) the respective member as a potential lead recommendation. The identified information fields include one or more of the member's occupation, the member's title, the member's employer, the member's seniority, the member's social graph, the member's activity data, and the member's work history.

The server system (e.g., system 120 in FIG. 1) ranks (718) the one or more identified potential sales lead recommendations. Ranking the one or more identified potential sales lead recommendations further includes the server system generating (720) a match score (or lead recommendations score) for each of the identified potential sales lead recommendations.

In some example embodiments the server system (e.g., system 120 in FIG. 1) ranks the one or more potential sales leads by associating different levels of importance with different information categories. For example, the server system determines that a member's job function is a better predictor of suitability than the member's work history. The server system then weights a member's job function more heavily when ranking various potential member profiles.

In some example embodiments the ranking of the one or more identified potential sales leads is based on the preferences of the member for whom the sales leads are being generated. For example, the first member established preferences that they prefer sales leads in a particular geographic area and members with a particular role within an organization.

In some example embodiments the lead recommendation score is generated based on a number of factors. Possible factors include information intentionally submitted to the server system (e.g., system 120 of FIG. 1). The list of received information that can be used to generate lead recommendation score include, but are not limited to, the location of the member (e.g., where the member lives or works), the member's job title, skills listed by the member, previously work history for a member, skills listed by the member, the member's seniority within the company, and the member's education. For example, when computing a lead recommendation score, the server system determines that Member A works in geographical area M (where the first member is located), has a job title associated with IT, and has been with Company F for 7 years, and Member B is located in geographical area Z, has a job title associated with janitorial work, and has been with Company C for 2 years. Given that Member D is a sales person for IT products in geographical area M, the server system generates a lead recommendation score that is higher for Member A than Member B.

In some example embodiments the lead recommendation score includes one or more pieces of inferred information. In some example embodiments information is inferred about members based on the information submitted by the members and the activities of the first member and the potential target members. For example, the server system (e.g., system 120 in FIG. 1) generates the lead recommendation score based, at least in part on the page views, member profile views, searches, customer relationships, and social graph changes (e.g., relationships that are added or ended) of one or more members.

In some example embodiments the server system (e.g., system 120 in FIG. 1) may generate lead recommendation scores based on the previous results of lead recommendations. For example, if the server system sends one or more lead recommendations to a member, the server system can then analyze the results of each recommendation. The server system can determine if the member clicks on the recommendation, saves the recommendation as relevant or interesting, attempts to contact the lead, makes a successful sale, or does not interact with the lead recommendation at all. The server system can then use the data gathered to better customize future recommendations (e.g., recommendations that match the characteristics of past successful recommendations are weighted more heavily than lead recommendations that do not match a previous successful sale).

The lead recommendation score for a respective potential target member may also be based in part on whether a particular potential target member is similar to other members that have purchased products from or through the first member. For example, the Member A has a customer relationship with six other members of the server system (e.g., system 120 in FIG. 1). Each of the six other members have been at their companies for over 5 years (e.g., a minimum seniority level) and work within 20 miles of City F. The server system then determines whether potential target members are similar to those existing companies by comparing the seniority and location of the potential target members to the existing customers.

Once the one or more potential target members have been ranked, the server system (e.g., system 120 in FIG. 1) selects one or more of the potential target leads as sales lead recommendations. Sales leads recommendations are recommendations for a sales person that identify a particular member of the server system that the sales person can contact as a potential new customer. The total number of selected recommendations is determined by the server system based on the space available for recommendations. For example, if the server system receives a web page request from the first member, the server system may select one or two sales lead recommendations to include with the requested webpage (e.g., in a side section of the webpage). In other examples, the first member requests a sales lead webpage (e.g., where the majority of the page is dedicated to displayed sales leads) and the server system determines the number of sales leads that will fit on the displayed webpage and sends the determined number of sales lead recommendations to the appropriate client system (e.g., system 102 in FIG. 1).

In some example embodiments the server system (e.g., system 120 in FIG. 1) selects (722) one or more of the identified sales lead recommendations. The server system then transmits (724) the selected one or more identified sales lead recommendations to a client device associated with the first member of the server system.

Software Architecture

Figure 8:
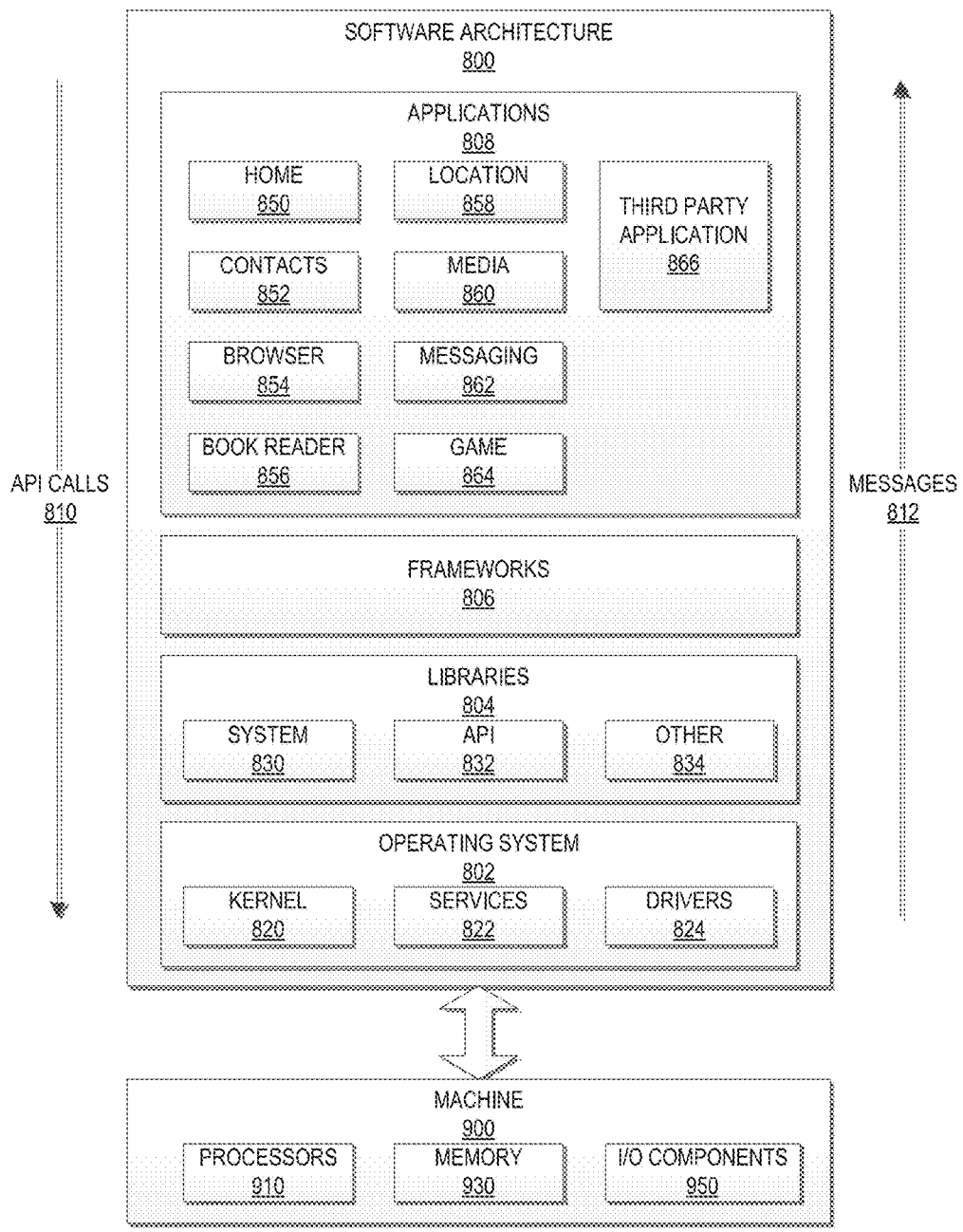
FIG. 8 is a block diagram illustrating architecture of software, which may be installed on any one or more of devices in accordance with some implementations.

FIG. 8 is a block diagram illustrating an architecture of software 800, which may be installed on any one or more of devices of FIG. 1 (e.g., client device(s) 102). FIG. 8 is merely a non-limiting example of a software architecture and it will be appreciated that many other architectures may be implemented to facilitate the functionality described herein. The software 800 may be executing on hardware such as machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 808. Operationally, the applications 808 may invoke application programming interface (API) calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 808. The libraries 804 may include system libraries 830 (e.g., C standard library) that may provide functions such as memory allocation functions, string manipulation functions, mathematic functions, and the like. In addition, the libraries 804 may include API libraries 832 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 808.

The frameworks 806 may provide a high-level common infrastructure that may be utilized by the applications 808. For example, the frameworks 806 may provide various graphic user interface (GUI) functions, high-level resource management, high-level location services, and so forth. The frameworks 806 may provide a broad spectrum of other APIs that may be utilized by the applications 808, some of which may be specific to a particular operating system or platform.

The applications 808 include a home application 850, a contacts application 852, a browser application 854, a book reader application 856, a location application 858, a media application 860, a messaging application 862, a game application 864, and a broad assortment of other applications such as third party application 866. In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 810 provided by the mobile operating system 802 to facilitate functionality described herein.

Example Machine Architecture and Machine-Readable Medium

Figure 9:
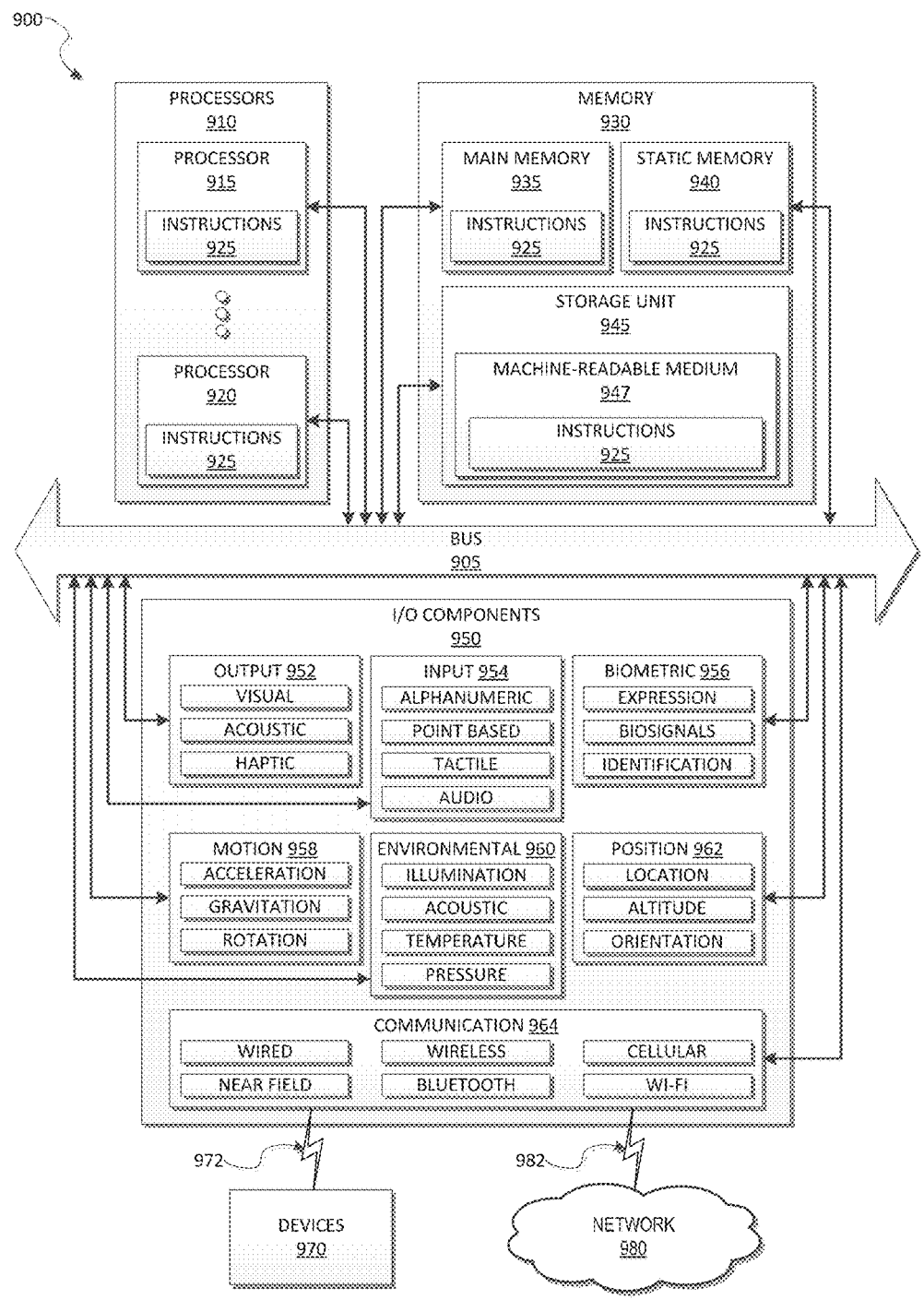
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 915 and processor 920 that may execute instructions 925. The term "processor" is intended to include multi-core processor that may comprise two or more independent processors (also referred to as "cores") that may execute instructions contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory 930 may include a main memory 935, a static memory 940, and a storage unit 945 accessible to the processors 910 via the bus 905. The storage unit 945 may include a machine-readable medium 947 on which is stored the instructions 925 embodying any one or more of the methodologies or functions described herein. The instructions 925 may also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, static memory 940, and the processors 910 may be considered as machine-readable media 947.

As used herein, the term "memory" refers to a machine-readable medium 947 able to store data temporarily or permanently and may be taken to include, but not be limited to, random-access memory (RAM), read-only memory (ROM), buffer memory, flash memory, and cache memory. While the machine-readable medium 947 is shown in an example embodiment to be a single medium, the term "machine-readable medium" should be taken to include a single medium or multiple media (e.g., a centralized or distributed database, or associated caches and servers) able to store instructions 925. The term "machine-readable medium" shall also be taken to include any medium, or combination of multiple media, that is capable of storing instructions (e.g., instructions 925) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 950 may include biometric components 956, motion components 958, environmental components 960, and/or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 and/or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine and/or any of a wide variety of peripheral devices (e.g., a peripheral device couple via a Universal Serial Bus (USB)).

Moreover, the communication components 964 may detect identifiers and/or include components operable to detect identifiers. For example, the communication components 964 may include Radio Frequency Identification (RFID) tag reader components, NPC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 964 such as location via Internet Protocol (IP) geo-location, location via Wi-Fi® signal triangulation, location via detecting a NIC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 925 may be transmitted and/or received using a transmission medium via the coupling 972 (e.g., a peer-to-peer coupling) to devices 970. The term "transmission medium" shall be taken to include any intangible medium that is capable of storing, encoding, or carrying instructions 925 for execution by the machine 900, and includes digital or analog communications signals or other intangible medium to facilitate communication of such software.

Furthermore, the machine-readable medium 947 is non-transitory (in other words, not having any transitory signals) in that it does not embody a propagating signal. However, labelling the machine-readable medium 947 as "non-transitory" should not be construed to mean that the medium 947 is incapable of movement; the medium 947 should be considered as being transportable from one physical location to another. Additionally, since the machine-readable medium 947 is tangible, the medium 947 may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for purpose of explanation, has been described with reference to specific implementations. However, the illustrative discussions above are not intended to be exhaustive or to limit the possible implementations to the precise forms disclosed. Many modifications and variations are possible in view of the above teachings. The implementations were chosen and described in order to best explain the principles involved and their practical applications, to thereby enable others skilled in the art to best utilize the various implementations with various modifications as are suited to the particular use contemplated.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A system comprising:
   a computer-readable medium having instructions stored thereon, which, when executed by a processor, cause the system to:
   identify, at a server hosting a social networking service, one or more target organizations for a first member of the social networking service;
   retrieve, from a database, a first plurality of member profiles corresponding to members of the social networking service associated with the one or more target organizations;
   obtain, from the retrieved first plurality of member profiles, one or more attributes of members corresponding to the retrieved first plurality of member profiles;
   retrieve, from the database, a second plurality of member profiles corresponding to members of the social networking service having attributes matching the one or more attributes;
   calculate a match score between each of the retrieved second plurality of member profiles corresponding to members of the social networking service having attributes matching, the one or more attributes and the first member the calculating of the match score further comprising:
      obtaining computerized records of interactions between the members and one or more graphical user interfaces associated with the social networking service, the computerized record for each interaction comprising a description of a user action initiated by the member and a time stamp indicating when the user action was initiated;
      identifying, in the computerized records, a plurality of records corresponding to interactions by members of the social networking service having attributes matching the one or more attributes and the first member; and
      applying a time-based weighting during the calculating of the match score, the weighting based on the time stamps for the plurality of records corresponding to interactions by members of the social networking service having attributes matching the one or more attributes and the first member;
   rank the one or more retrieved second plurality of member profiles based on their corresponding match scores; and
   surface one or more highest ranked member profiles in a graphical user interface as a recommended lead for the first member.

2. The system of claim 1, wherein an organization is associated with a member if the organization employs the member.

3. The system of claim 1, wherein at least one of the first plurality of member profiles is imported from a customer relationship management (CRM) software server external to the server hosting the social networking service.

4. The system of claim 1, wherein the one or more user preferences includes geographical area.

5. The system of claim 1, wherein the one or more user preferences includes member title.

6. The system of claim 1, wherein the one or more user preferences includes member past sales information.

7. The system of claim 1, wherein the one or more user preferences includes school.

8. A method comprising:
   identifying, at a server hosting a social networking service, one or more target organizations for a first member of the social networking service;
   retrieving, from a database, a first plurality of member profiles corresponding to members of the social networking service associated with the one or more target organizations;
   obtaining, from the retrieved first plurality of member profiles, one or more attributes of members corresponding to the retrieved first plurality of member profiles;
   retrieving, from the database, a second plurality of member profiles corresponding to members of the social networking service having attributes matching the one or more attributes;
   calculating a match score between each of the retrieved second plurality of member profiles corresponding to members of the social networking service having attributes matching the one or more attributes and the first member, the one or more attributes and the first member the calculating of the match score further comprising:
      obtaining computerized records of interactions between the members and one or more graphical user interfaces associated with the social networking service, the computerized record for each interaction comprising a description of a user action initiated by the member and a time stamp indicating when the user action was initiated;
      identifying, in the computerized records, a plurality of records corresponding to interactions by members of the social networking service having attributes matching the one or more attributes and the first member; and
      applying a time-based weighting during the calculating of the match score, the weighting based on the time stamps for the plurality of records corresponding to interactions by members of the social networking service having attributes matching the one or more attributes and the first member;
   ranking the one or more retrieved second plurality of member profiles based on their corresponding match scores; and
   surfacing one or more highest ranked member profiles in a graphical user interface as a recommended lead for the first member.

9. The method of claim 8, wherein an organization is associated with a member if the organization employs the member.

10. The method of claim 8, wherein at least one of the first plurality of member profiles is imported from a customer relationship management (CRM) software server external to the server hosting the social networking service.

11. The method of claim 8, wherein the one or more user preferences includes geographical area.

12. The method of claim 8, wherein the one or more user preferences includes member title.

13. The method of claim 8, wherein the one or more user preferences includes member past sales information.

14. The method of claim 8, wherein the one or more user preferences includes school.

15. A non-transitory computer readable storage medium storing one or more programs for execution by one or more processors, the one or more programs comprising instructions for:
   recording, at a server hosting a social networking service, interaction of a first member of the social networking service with the social networking service, the interaction including viewing one or more member profiles in the social networking service without having performed a search query or providing specific search criteria for the one or more member profiles;
   identifying, at a server hosting a social networking service, one or more target organizations for a first member of the social networking service;
   retrieving, from a database, a first plurality of member profiles corresponding to members of the social networking service associated with the one or more target organizations;
   obtaining, from the retrieved first plurality of member profiles, one or more attributes of members corresponding to the retrieved first plurality of member profiles;
   retrieving, from the database, a second plurality of member profiles corresponding to members of the social networking service having attributes matching the one or more attributes;
   calculating a match score between each of the retrieved second plurality of member profiles corresponding to members of the social networking service having attributes matching the one or more attributes and the first member, the one or more attributes and the first member the calculating of the match score further comprising:
      obtaining computerized records of interactions between the members and one or more graphical user interfaces associated with the social networking service, the computerized record for each interaction comprising a description of a user action initiated by the member and a time stamp indicating when the user action was initiated;
      identifying, in the computerized records, a plurality of records corresponding to interactions by members of the social networking service having attributes matching the one or more attributes and the first member; and
      applying a time-based weighting during the calculating of the match score, the weighting based on the time stamps for the plurality of records corresponding to interactions by members of the social networking service having attributes matching the one or more attributes and the first member;
   ranking the one or more retrieved second plurality of member profiles based on their corresponding match scores; and
   surfacing one or more highest ranked member profiles in a graphical user interface as a recommended lead for the first member.

16. The non-transitory computer readable storage medium of claim 15, wherein an organization is associated with a member if the organization employs the member.

17. The non-transitory computer readable storage medium of claim 15, wherein at least one of the first plurality of member profiles is imported from a customer relationship management (CRM) software server external to the server hosting the social networking service.

18. The non-transitory computer readable storage medium of claim 15, wherein the one or more user preferences includes geographical area.

19. The non-transitory computer readable storage medium of claim 15, wherein the one or more user preferences includes member title.

\* \* \* \* \*

UNITED STATES PATENT AND TRADEMARK OFFICE
CERTIFICATE OF CORRECTION

PATENT NO. : 10,043,205 B2
APPLICATION NO. : 14/572236
DATED : August 7, 2018
INVENTOR(S) : Gupta et al.

Page 1 of 1

It is certified that error appears in the above-identified patent and that said Letters Patent is hereby corrected as shown below:

In the Claims

In Column 23, Line 59, in Claim 1, after "to", delete "¶"

Signed and Sealed this
Twentieth Day of August, 2019

Andrei Iancu
*Director of the United States Patent and Trademark Office*